United States Patent
Lee et al.

(10) Patent No.: US 9,633,792 B2
(45) Date of Patent: Apr. 25, 2017

(54) CONDUCTIVE PASTE FOR EXTERNAL ELECTRODE, MULTILAYER CERAMIC ELECTRONIC COMPONENT USING THE SAME, AND MANUFACTURING METHOD THEREOF

(71) Applicant: SAMSUNG ELECTRO-MECHANICS CO., LTD., Suwon-Si, Gyeonggi-Do (KR)

(72) Inventors: Chi Hwa Lee, Suwon-Si (KR); Sang Min Youn, Suwon-Si (KR); Kum Jin Park, Suwon-Si (KR); Chang Hak Choi, Suwon-Si (KR); Jin Woo Kim, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 151 days.

(21) Appl. No.: 14/719,304

(22) Filed: May 21, 2015

(65) Prior Publication Data
US 2016/0099110 A1    Apr. 7, 2016

(30) Foreign Application Priority Data
Oct. 6, 2014  (KR) .......................... 10-2014-0134265

(51) Int. Cl.
*H01G 4/30* (2006.01)
*H01G 4/232* (2006.01)
*C09D 5/24* (2006.01)

(52) U.S. Cl.
CPC ................ *H01G 4/30* (2013.01); *C09D 5/24* (2013.01); *H01G 4/2325* (2013.01)

(58) Field of Classification Search
CPC .......... H01G 4/30; H01G 4/005; H01G 4/228; H01G 4/232; H01G 4/248
See application file for complete search history.

(56) References Cited

U.S. PATENT DOCUMENTS

| | | | | |
|---|---|---|---|---|
| 4,881,308 A | * | 11/1989 | McLaughlin | H01G 4/232 29/25.42 |
| 4,935,843 A | * | 6/1990 | McLaughlin | H01G 4/232 29/25.42 |
| 2011/0299221 A1 | * | 12/2011 | Higashi | H01C 1/142 361/305 |
| 2012/0262836 A1 | * | 10/2012 | Chai | H01G 4/30 361/301.4 |
| 2015/0090483 A1 | * | 4/2015 | Moon | H01G 4/30 174/260 |

FOREIGN PATENT DOCUMENTS

| | | |
|---|---|---|
| JP | 2013-073952 A | 4/2013 |
| KR | 10-2005-0102767 A | 10/2005 |

* cited by examiner

*Primary Examiner* — Dion R Ferguson
(74) *Attorney, Agent, or Firm* — NSIP Law

(57) ABSTRACT

A conductive paste for an external electrode, a multilayer ceramic electronic component using the same, and a manufacturing method of a multilayer ceramic electronic component are provided. The conductive paste for an external electrode includes first conductive particles containing a metal, second conductive particles formed of ceramic particles coated with silver (Ag), and a thermosetting resin.

19 Claims, 4 Drawing Sheets

A-A'

CONDUCTIVE PASTE FOR EXTERNAL ELECTRODE, MULTILAYER CERAMIC ELECTRONIC COMPONENT USING THE SAME, AND MANUFACTURING METHOD THEREOF

CROSS-REFERENCE TO RELATED APPLICATION

This application claims the priority and benefit of Korean Patent Application No. 10-2014-0134265 filed on Oct. 6, 2014, with the Korean Intellectual Property Office, the disclosure of which is incorporated herein by reference.

BACKGROUND

The present disclosure relates to a conductive paste for an external electrode for improving equivalent series resistance (ESR) characteristics of a multilayer ceramic electronic component, a multilayer ceramic electronic component using the same, and a manufacturing method thereof.

Among ceramic electronic components, a multilayer ceramic capacitor includes a plurality of stacked dielectric layers, internal electrodes disposed to face each other with respective dielectric layers interposed therebetween, and external electrodes electrically connected to the internal electrodes.

Multilayer ceramic capacitors have been widely used as component for computers, a mobile communications device such as a personal digital assistance (PDA), a mobile phone, or the like, due to advantages such as a small size, high capacitance, ease of mounting, or the like.

As electronic products have been miniaturized and multifunctionalized, chip components have also been miniaturized and multifunctionalized. Therefore, small sized multilayer ceramic capacitors having high capacitance have been demanded.

To this end, multilayer ceramic capacitors in which an increased amount of dielectric layers are stacked due to thicknesses of the dielectric layers and internal electrode layers being reduced have been manufactured, and external electrodes have also been thinned.

In addition, as various functions of devices used in fields requiring high degrees of reliability, such as vehicles or medical devices have been digitalized and demand therefor has increased, high reliability is also required in the multilayer ceramic capacitors included therein.

A major factor causing problems in terms of high reliability is the generation of cracks due to external impacts, or the like, and in order to solve this problem, a resin composition containing a conductive material is applied between electrode layers and plating layers of the external electrodes, such that external impacts may be absorbed thereby, and infiltration of a plating solution may be prevented, thereby improving reliability.

However, in the case of applying the resin composition containing the conductive material between the electrode layers and the plating layers of the external electrodes, ESR may be increased, and ripple and heat-generation characteristics may become unstable.

RELATED ART DOCUMENT (Patent Document 1) Japanese Patent Laid-Open Publication No. 2013-073952

SUMMARY

An aspect of the present disclosure may provide a conductive paste for an external electrode for improving equivalent series resistance (ESR) characteristics of a multilayer ceramic electronic component, a multilayer ceramic electronic component having the same, and a manufacturing method thereof.

According to an aspect of the present disclosure, a conductive paste for an external electrode may include first conductive particles containing a metal, second conductive particles formed of ceramic particles coated with silver (Ag), and a thermosetting resin.

The ceramic particles may have an average particle size of 0.003 μm to 2.0 μm and be formed of one or more of spherical $TiO_2$, rod-type $TiO_2$, and tube type $TiO_2$.

According to another aspect of the present disclosure, a multilayer ceramic electronic component may include a ceramic body including dielectric layers, first and second internal electrodes disposed in the ceramic body to face each other with respective dielectric layers interposed therebetween, a first electrode layer electrically connected to the first internal electrodes and a second electrode layer electrically connected to the second internal electrodes, and a first conductive resin layer formed on the first electrode layer and a second conductive resin layer formed on the second electrode layer, wherein the first and second conductive resin layers include first conductive particles containing a metal, second conductive particles formed of ceramic particles coated with silver (Ag), and a thermosetting resin.

The ceramic particles may have an average particle size of 0.003 μm to 2.0 μm and be formed of one or more of spherical $TiO_2$, rod-type $TiO_2$, and tube type $TiO_2$.

According to another aspect of the present disclosure, a manufacturing method of a multilayer ceramic electronic component may include preparing a ceramic body including dielectric layers and first and second internal electrodes disposed to face each other with respective dielectric layers interposed therebetween, forming first and second electrode layers to be electrically connected to the first and second internal electrodes, respectively; preparing second conductive particles formed of ceramic particles coated with silver (Ag) using a silver (Ag) precursor, the ceramic particles, and a reducing agent, preparing a conductive paste for an external electrode by mixing first conductive particles containing a metal, the second conductive particles, and a thermosetting resin with each other, and forming first and second conductive resin layers on the first and second electrode layers by applying the conductive paste for an external electrode and curing the applied conductive paste.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
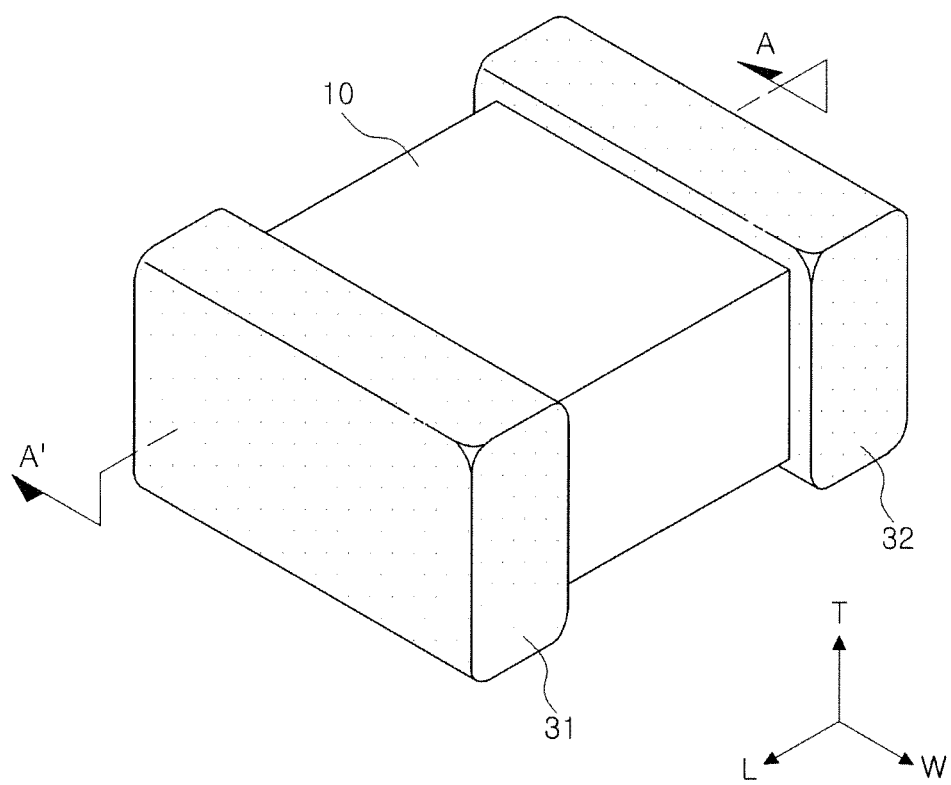
FIG. 1 is a perspective view schematically showing a multilayer ceramic capacitor according to an exemplary embodiment of the present disclosure.

Exemplary embodiments of the present disclosure will now be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements maybe exaggerated for clarity, and the same reference numerals will be used throughout to designate the same or like elements.

A conductive paste for an external electrode according to an exemplary embodiment of the present disclosure may contain first conductive particles containing a metal, second conductive particles formed of ceramic particles coated with silver (Ag), and a thermosetting resin.

The ceramic particles may have an average particle size of 0.003 μm to 2.0 μm and be formed of one or more of spherical $TiO_2$, rod-type $TiO_2$, and tube type $TiO_2$.

A coating content of the silver (Ag) may be 1 to 30 wt % based on a content of the ceramic particles, but is not necessarily limited thereto.

Contents of the second conductive particles and the thermosetting resin may be 0.5 to 10 parts by weight and 5 to 30 parts by weight, respectively, based on 100 parts by weight of the first conductive particles.

The first conductive particles may be formed of one or more selected from the group consisting of copper (Cu), nickel (Ni), silver (Ag), and sliver-palladium (Ag—Pd).

FIG. 1 is a perspective view schematically showing a multilayer ceramic capacitor according to an exemplary embodiment of the present disclosure.

Figure 2:
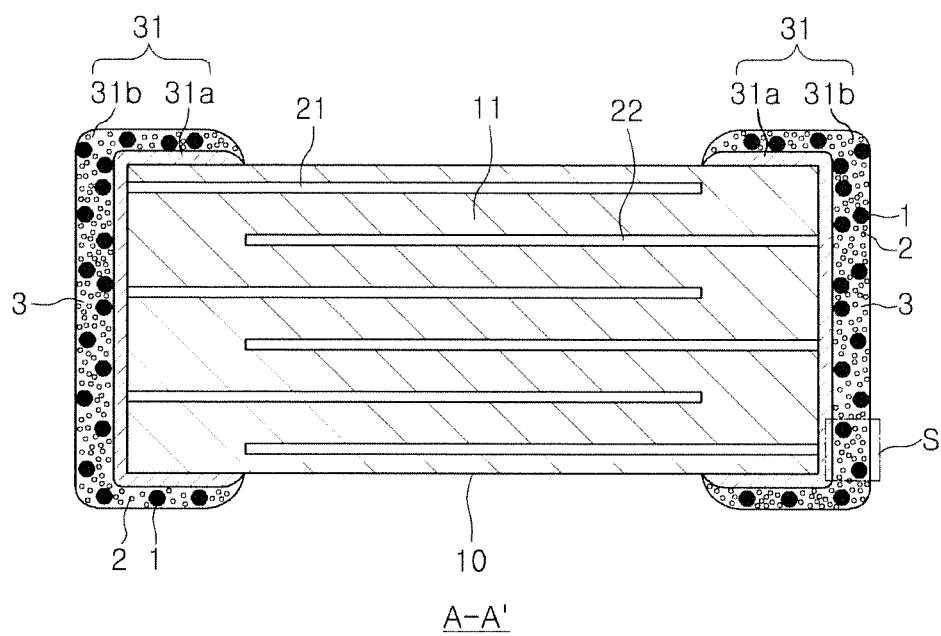
FIG. 2 is a cross-sectional view of the multilayer ceramic capacitor according to an exemplary embodiment of the present disclosure, taken along the line A-A' of FIG. 1.

FIG. 2 is a cross-sectional view of the multilayer ceramic capacitor according to an exemplary embodiment of the present disclosure, taken along the line A-A' of FIG. 1.

Figure 3:
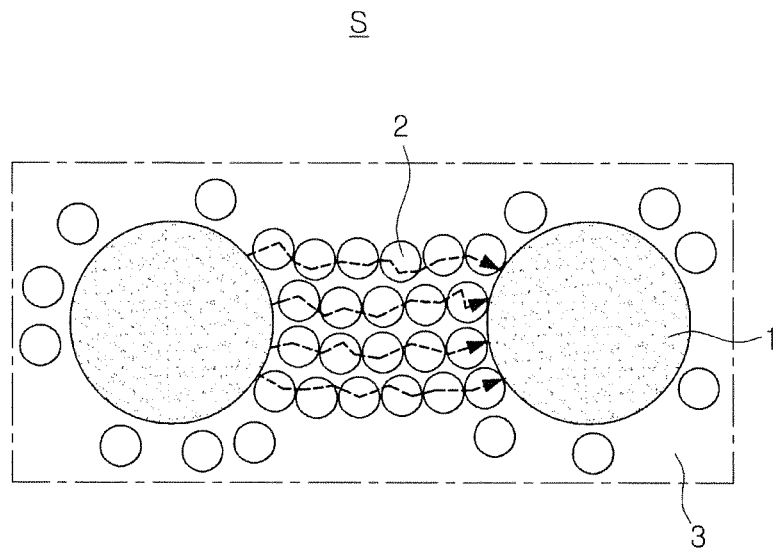
FIG. 3 is an enlarged view of part S of FIG. 2.

FIG. 3 is an enlarged view of part S of FIG. 2.

Referring to FIGS. 1 through 3, according to another exemplary embodiment of the present disclosure, there is provided a multilayer ceramic electronic component including: a ceramic body 10 including dielectric layers 11; first and second internal electrodes 21 and 22 disposed in the ceramic body 10 to face each other with respective dielectric layers interposed therebetween; a first electrode layer 31a electrically connected to the first internal electrodes 21 and a second electrode layer 32a electrically connected to the second internal electrodes 22; and a first conductive resin layer 31b formed on the first electrode layer 31a and a second conductive resin layer 32b formed on the second electrode layer 32a, wherein the first and second conductive resin layers 31b and 32b contain first conductive particles 1 containing a metal, second conductive particles 2 formed of ceramic particles coated with silver (Ag), and a thermosetting resin 3.

Since the first and second conductive resin layers 31b and 32b are formed by using the conductive paste for an external electrode according to an exemplary embodiment of the present disclosure, a description thereof will be provided below.

In an exemplary embodiment of the present disclosure, a shape of the ceramic body 10 is not particularly limited, but may be a hexahedral shape as shown in the accompanying drawing.

In an exemplary embodiment of the present disclosure, the ceramic body 10 may have first and second main surfaces opposing each other, first and second end surfaces opposing each other in a length direction, and first and second side surfaces opposing each other in a width direction, wherein the first and second main surfaces may be indicated as upper and lower surfaces of the ceramic body 10.

According to an exemplary embodiment of the present disclosure, a raw material forming the dielectric layer 11 is not particularly limited as long as sufficient capacitance may be obtained, but may be, for example, barium titanate ($BaTiO_3$) powder.

The material forming the dielectric layer 11 may further contain various ceramic additives, organic solvents, plasticizers, binders, dispersing agents, or the like, according to an object of the present disclosure in addition to the powder such as barium titanate ($BaTiO_3$) powder, or the like.

An average particle size of ceramic powder used to form the dielectric layer 11 is not particularly limited and may be controlled in order to achieve the object of the present disclosure. For example, the average particle size may be controlled to be 400 nm or less.

The internal electrodes 21 and 22, which are a pair of first and second internal electrodes having different polarities from each other, may be formed by printing a conductive paste containing a conductive metal on the dielectric layer 11 at a predetermined thickness.

In addition, the first and second internal electrodes 21 and 22 may be formed in a direction in which the dielectric layers 11 are stacked, and may be electrically insulated from each other by the dielectric layer 11 disposed therebetween.

A material forming the first and second internal electrodes 21 and 22 is not particularly limited, but may contain, for example, one or more materials of silver (Ag), lead (Pb), platinum (Pt), nickel (Ni), and copper (Cu).

According to an exemplary embodiment of the present disclosure, first and second external electrodes 31 and 32 connected to the first and second internal electrodes 21 and 22 may be disposed on both end portions of the ceramic body 10.

The first and second external electrodes 31 and 32 may include first electrode layers 31a electrically connected to the first internal electrodes 21 and the second electrode layer 32a electrically connected to the second internal electrodes 22, and the first conductive resin layer 31b formed on the first electrode layer 31a and the second conductive resin layer 32b formed on the second electrode layer 32a.

A material forming the first and second electrode layers 31a and 32a is not particularly limited as long as the material may electrically connect the first and second electrode layers 31a and 32a to the first and second internal electrodes 21 and 22. For example, the material may be formed of one or more selected from the group consisting of copper (Cu), nickel (Ni), silver (Ag), and silver-palladium (Ag—Pd)

The first and second electrode layers 31a and 32a may be formed by applying and sintering a conductive paste prepared by mixing one or more selected from the group consisting of copper (Cu), nickel (Ni), silver (Ag), and sliver-palladium (Ag—Pd), with glass frit.

The first and second conductive resin layers 31b and 32b may contain the first conductive particles 1 containing the metal, the second conductive particles 2 in which silver (Ag) is coated on the surfaces of the ceramic particles, and the thermosetting resin 3.

The first conductive particles 1 containing the metal maybe formed of one or more selected from the group consisting of copper (Cu), nickel (Ni), silver (Ag), and sliver-palladium (Ag—Pd), but is not limited thereto.

The thermosetting resin 3 is not particularly limited as long as it has an adhesive property and an impact absorption property and may be mixed with the first conductive particles 1 to thereby prepare the paste. For example, the thermosetting resin 3 may include an epoxy based resin.

A content of the thermosetting resin 3 may be 5 to 30 parts by weight based on 100 parts by weight of the first conductive particles 1, but is not necessarily limited thereto.

In the case in which the content of the thermosetting resin 3 is less than 5 parts by weight based on 100 parts by weight of the first conductive particles 1, it may be difficult to prepare the paste due to insufficiency of the resin, phase separation or a time-dependent change in viscosity may be generated due to deterioration of phase stability, a filling rate may be deceased due to deterioration of dispersibility of the metal, and accordingly, a degree of densification may be deteriorated.

Meanwhile, in the case in which the content of the thermosetting resin 3 is more than 30 parts by weight based on 100 parts by weight of the first conductive particles 1, since the content of the resin is excessive, a contact property between the metals may be decreased, such that resistivity may be increased, and a resin area in a surface portion may be increased, such that at the time of forming the plating layers after forming the conductive resin layers 31b and 32b, plating failure may occur.

According to an exemplary embodiment and another exemplary embodiment of the present disclosure, the conductive paste for an external electrode, and the first and second conductive resin layers 31b and 32b formed using the conductive paste may contain the second conductive particles 2 in which silver (Ag) is coated on the surfaces of the ceramic particles.

Generally, in the case of a conductive paste for a sintering-type external electrode, at the time of forming external electrodes of a multilayer ceramic electronic component, when a thickness of the external electrodes is thin, the sealing may be difficult, such that a reliability deterioration problem due to infiltration of a plating solution has been frequently generated.

Further, as a factor causing problems in high reliability, there is crack generation by external impact, or the like, and in order to solve this problem, a resin composition containing a conductive material is applied between electrode layers and plating layers of the external electrodes, such that external impact may be absorbed, and infiltration of a plating solution may be prevented, thereby improving reliability.

However, in the case of applying the resin composition containing the conductive material between the electrode layers and the plating layers of the external electrodes, ESR may be increased, and ripple and heat-generation characteristics may become unstable.

According to an exemplary embodiment and another exemplary embodiment of the present disclosure, the conductive paste for an external electrode, and the first and second conductive resin layers 31b and 32b formed using the conductive paste may contain the second conductive particles 2 in which silver (Ag) is coated on the surface of the ceramic particles, thereby improving the ESR characteristics of the multilayer ceramic electronic component while imparting high reliability to the multilayer ceramic electronic component.

Referring to FIG. 3, in the case in which the second conductive particles 2 in which silver (Ag) is coated on the surfaces of the ceramic particles are contained in the conductive paste for an external electrode according to an exemplary embodiment of the present disclosure as a conductive filler, the electron transfer between the first conductive particles 1 containing the metal may be facilitated, such that the ESR characteristics may be improved.

The ceramic particles may be formed of $TiO_2$ or $SiO_2$, but is necessarily limited thereto. Any ceramic material may be used.

However, in the case in which the ceramic particles are be formed of $TiO_2$ or $SiO_2$, the ceramic particles may perform functions as an excellent electron transfer channel between the first conductive particles 1 in the first and second conductive resin layers 31b and 32b as the conductive filler.

An average particle size of the ceramic particles is not particularly limited, but may be, for example, 0.003 μm to 2.0 μm.

In the case in which the average particle size of the ceramic particles is less than 0.003 μm, the particle size is excessively small, such that the ceramic particles may not sufficiently serve to absorb impact, and in the case in which the average particle size is more than 2.0 μm, necking of the first conductive particle 1 powder contained in the first and second conductive resin layers 31b and 32b may be inhibited, such that conductivity may not be secured or plating failure may occur.

A shape of the ceramic particle may be one or more of a spherical shape, a rod shape, and a tube shape, but is not necessarily limited thereto. That is, the ceramic particles may have various shapes.

A coating content of silver (Ag) is not particularly limited, but may be, for example, 1 to 30 wt % based on the content of the ceramic particles.

The coating content of silver (Ag) is adjusted to be 1 to 30 wt % based on the content of the ceramic particles, such that the ceramic particles may perform functions as the excellent electron transfer channel between the first conductive particles 1 in the first and second conductive resin layers 31b and 32b, thereby improving the ESR characteristics of the multilayer ceramic electronic component while imparting high reliability to the multilayer ceramic electronic component.

In the case in which the coating content of silver (Ag) is less than 1 wt based on the content of the ceramic particles, it is difficult to perform the functions as the electron transfer channel between the first conductive particles 1, such that it is difficult to decrease ESR of the multilayer ceramic electronic component.

In the case in which the coating content of silver (Ag) is more than 30 wt % based on the content of the ceramic particles, at the time of forming the plating layers on the first and second conductive resin layers 31b and 32b, plating failure may occur or adhesion strength may be deteriorated.

According to an exemplary embodiment of the present disclosure, the contents of the second conductive particles 2 and the thermosetting resin 3 may be 0.5 to 10 parts by weight and 5 to 30 parts by weight, respectively, based on 100 parts by weight of the first conductive particles 1.

Nickel/tin (Ni/Sn) plating layers may be additionally disposed on the first and second conductive resin layers 31b and 32b.

Figure 4:
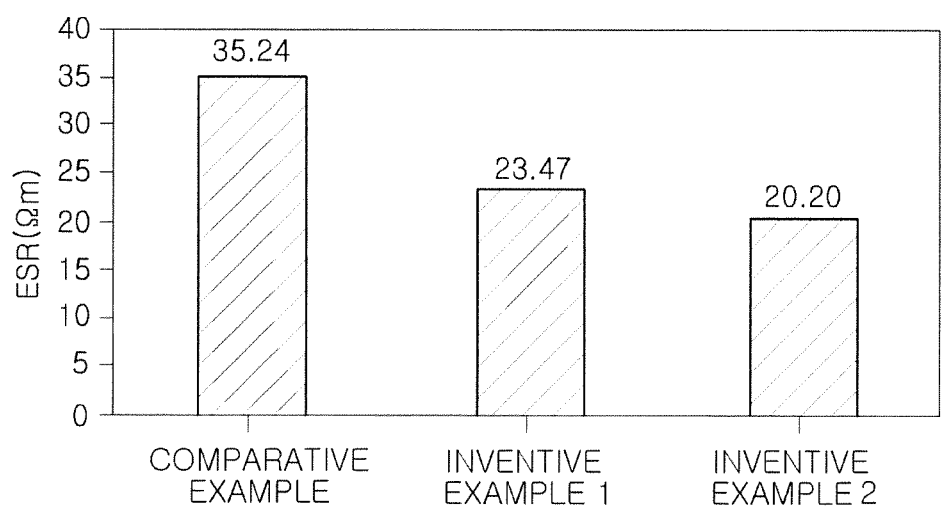
FIG. 4 is a graph comparing ESR characteristics of multilayer ceramic capacitors according to an exemplary embodiment of the present disclosure and Comparative Example.

FIG. 4 is a graph comparing ESR characteristics of multilayer ceramic capacitors according to an exemplary embodiment of the present disclosure and Comparative Example.

Referring to FIG. 4, in Comparative Example, first and second conductive resin layers of a multilayer ceramic capacitor were formed using a paste for an external electrode obtained by mixing copper (Cu) and an epoxy resin with each other.

Meanwhile, Inventive Example 1, first and second conductive resin layers of a multilayer ceramic capacitor were formed using a paste for an external electrode obtained by adding 3 wt % of Ag—$TiO_2$ particles having a particle size of 3 nm based on copper (Cu) and mixing epoxy resin therewith.

In addition, Inventive Example 2, first and second conductive resin layers of a multilayer ceramic capacitor were formed using a paste for an external electrode obtained by adding 3 wt % of Ag—$TiO_2$ particles having a particle size of 200 nm based on copper (Cu) and mixing epoxy resin therewith.

Referring to FIG. 4, it may be appreciated that in Inventive Examples 1 and 2 in which conductive Ag—$TiO_2$ particles were used as a filler in the copper (Cu)-epoxy paste, ESR characteristics were improved regardless of the particle size of $TiO_2$ particles.

That is, it may be appreciated that since Ag was coated on surfaces of the TiO2 particles, copper (Cu) particles may transfer along surfaces of Ag—TiO2 particles in the copper (Cu)-epoxy paste, such that the ESR characteristics were improved by about 30% as compared to Comparative Example in which the paste for an external electrode obtained by mixing copper (Cu) and the epoxy resin with each other was used.

Figure 5:
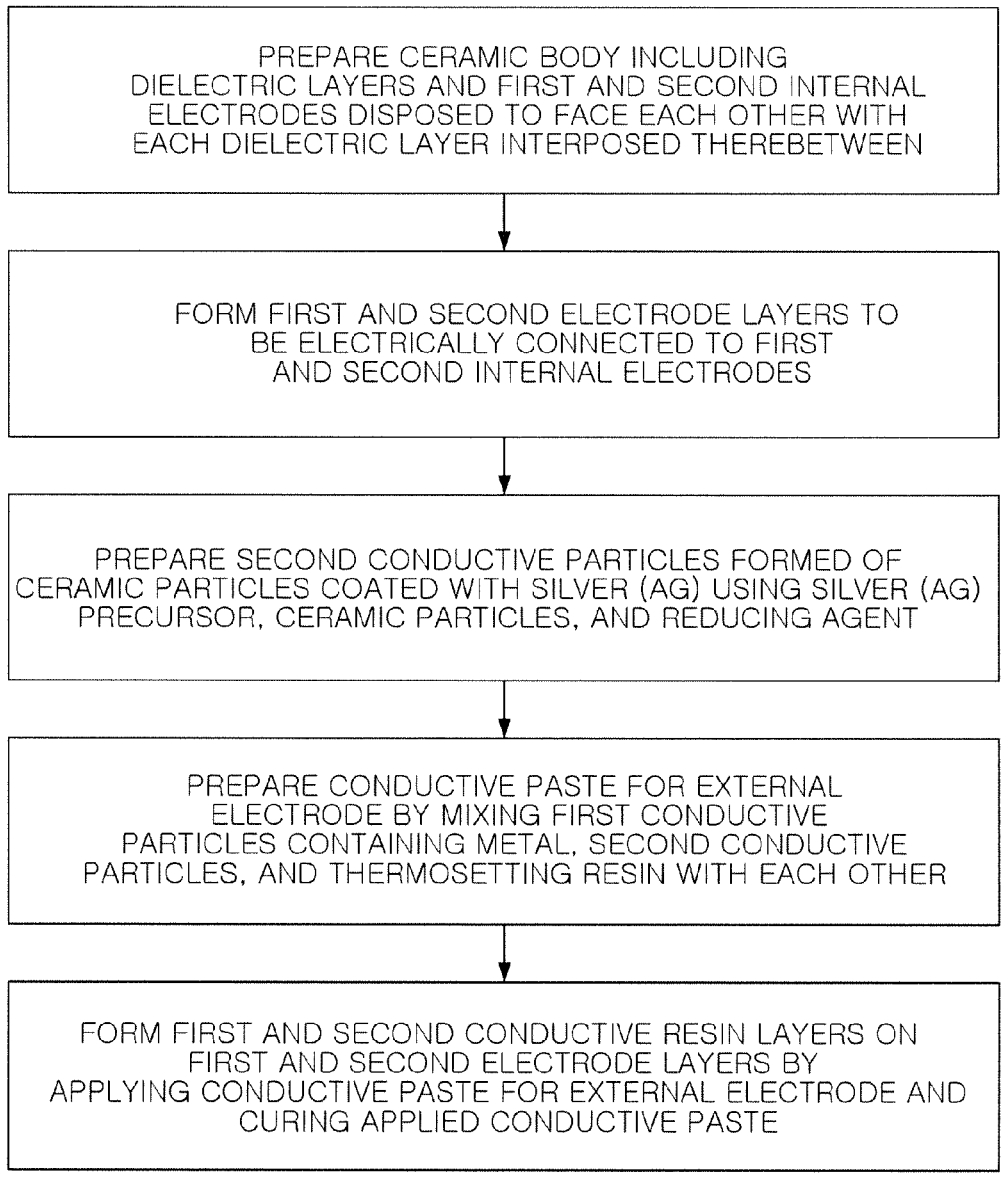
FIG. 5 is a flow chart showing a manufacturing method of a multilayer ceramic electronic component according to another exemplary embodiment of the present disclosure.

FIG. 5 is a flow chart showing a manufacturing method of a multilayer ceramic electronic component according to another exemplary embodiment of the present disclosure.

Referring to FIG. 5, there is provided a manufacturing method of a multilayer ceramic electronic component including: preparing a ceramic body 10 including dielectric layers 11 and first and second internal electrodes 21 and 22 disposed to face each other with respective dielectric layers 11 interposed therebetween; forming first and second electrode layers 31a and 32a to be electrically connected to the first and second internal electrodes 21 and 22; preparing second conductive particles 2 formed of ceramic particles coated with silver (Ag) using a silver (Ag) precursor, the ceramic particles, and a reducing agent; preparing a conductive paste for an external electrode by mixing first conductive particles 1 containing a metal, the second conductive particles 2, and a thermosetting resin 3 with each other; and forming first and second conductive resin layers 31b and 32b on the first and second electrode layers 31a and 32a by applying the conductive paste for an external electrode and curing the applied conductive paste.

The silver (Ag) precursor is not particularly limited. For example, the silver (Ag) precursor may be silver nitrate ($AgNO_3$)

Since other features of the manufacturing method of a multilayer ceramic capacitor are overlapped with those of the multilayer ceramic capacitor according to an exemplary embodiment of the present disclosure, a description thereof will be omitted.

As set forth above, according to exemplary embodiments of the present disclosure, the paste for an external electrode capable of improving the ESR characteristics of the multilayer ceramic electronic component, the multilayer ceramic electronic component using the same, and the manufacturing method thereof may be provided.

Particularly, the paste for an external electrode containing a silver-epoxy (Ag-Epoxy) composition that may be used between the external electrodes and the plating layers of the multilayer ceramic electronic component to improve the ESR characteristics of the multilayer ceramic electronic component while imparting high reliability to the multilayer ceramic electronic component, the multilayer ceramic electronic component using the same, and the manufacturing method thereof may be provided.

While exemplary embodiments have been shown and described above, it will be apparent to those skilled in the art that modifications and variations could be made without departing from the scope of the present invention as defined by the appended claims.

What is claimed is:

1. A conductive paste for an external electrode comprising:
   first conductive particles containing a metal;
   second conductive particles formed of ceramic particles coated with silver (Ag); and
   a thermosetting resin.

2. The conductive paste for an external electrode of claim 1, wherein the ceramic particles are formed of $Tio_2$.

3. The conductive paste for an external electrode of claim 1, wherein the ceramic particles have an average particle size of 0.003 μm to 2.0 μm.

4. The conductive paste for an external electrode of claim 1, wherein shapes of the ceramic particles are one or more of a spherical shape, a rod shape, and a tube shape.

5. The conductive paste for an external electrode of claim 1, wherein a coating content of the silver (Ag) is 1 to 30 wt % based on a content of the ceramic particles.

6. The conductive paste for an external electrode of claim 1, wherein contents of the second conductive particles and the thermosetting resin are 0.5 to 10 parts by weight and 5 to 30 parts by weight, respectively, based on 100 parts by weight of the first conductive particles.

7. The conductive paste for an external electrode of claim 1, wherein the first conductive particles are formed of one or more selected from the group consisting of copper (Cu), nickel (Ni), silver (Ag), and silver-palladium (Ag—Pd).

8. A multilayer ceramic electronic component comprising:
   a ceramic body including dielectric layers;
   first and second internal electrodes disposed in the ceramic body to face each other with respective dielectric layers interposed therebetween;
   a first electrode layer electrically connected to the first internal electrodes and a second electrode layer electrically connected to the second internal electrodes; and
   a first conductive resin layer formed on the first electrode layer and a second conductive resin layer formed on the second electrode layer
   wherein the first and second conductive resin layers contain first conductive particles containing a metal, second conductive particles formed of ceramic particles coated with silver (Ag), and a thermosetting resin.

9. The multilayer ceramic electronic component of claim 8, wherein the ceramic particles are formed of $TiO_2$.

10. The multilayer ceramic electronic component of claim 8, wherein the ceramic particles have an average particle size of 0.003 μm to 2.0 μm.

11. The multilayer ceramic electronic component of claim 8, wherein shapes of the ceramic particles are one or more of a spherical shape, a rod shape, and a tube shape.

12. The multilayer ceramic electronic component of claim 8, wherein a coating content of silver (Ag) is 1 to 30 wt % based on a content of the ceramic particles.

13. The multilayer ceramic electronic component of claim 8, wherein contents of the second conductive particles and the thermosetting resin are 0.5 to 10 parts by weight and 5 to 30 parts by weight, respectively, based on 100 parts by weight of the first conductive particles.

14. The multilayer ceramic electronic component of claim 8, wherein the first conductive particles are formed of one or more selected from the group consisting of copper (Cu), nickel (Ni), silver (Ag), and silver-palladium (Ag—Pd).

15. A manufacturing method of a multilayer ceramic electronic component, the manufacturing method comprising:
　preparing a ceramic body including dielectric layers and first and second internal electrodes disposed to face each other with respective dielectric layers interposed therebetween;
　forming first and second electrode layers to be electrically connected to the first and second internal electrodes, respectively;
　preparing second conductive particles formed of ceramic particles coated with silver (Ag) using a silver (Ag) precursor, the ceramic particles, and a reducing agent;
　preparing a conductive paste for an external electrode by mixing first conductive particles containing a metal, the second conductive particles, and a thermosetting resin with each other; and
　forming first and second conductive resin layers on the first and second electrode layers by applying the conductive paste for an external electrode and curing the applied conductive paste.

16. The manufacturing method of claim 15, wherein the ceramic particles are formed of $TiO_2$.

17. The manufacturing method of claim 15, wherein the ceramic particles have an average particle size of 0.003 μm to 2.0 μm.

18. The manufacturing method of claim 15, wherein a coating content of the silver (Ag) is 1 to 30 wt % based on a content of the ceramic particles.

19. The manufacturing method of claim 15, wherein contents of the second conductive particles and the thermosetting resin are 0.5 to 10 parts by weight and 5 to 30 parts by weight, respectively, based on 100 parts by weight of the first conductive particles.

* * * * *